No. 709,213. Patented Sept. 16, 1902.
F. E. FISHER.
VEHICLE AXLE.
(Application filed Dec. 5, 1901. Renewed Aug. 11, 1902.)
(No Model.)
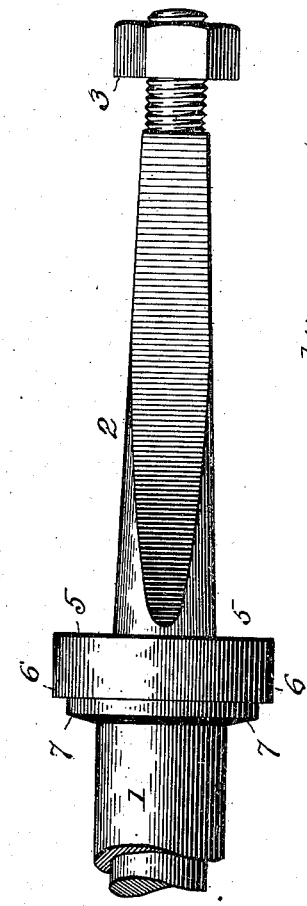
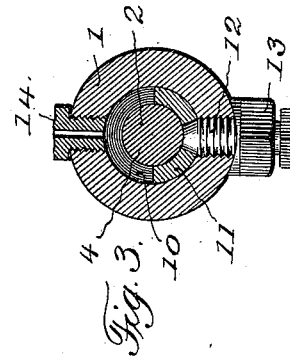
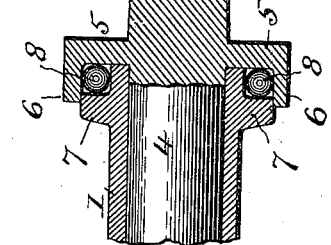
Attest:
John Enders Jr
M. H. Holmes.
Inventor:
Francis E. Fisher,
by
Robert Burns
Attorney.

UNITED STATES PATENT OFFICE.

FRANCIS E. FISHER, OF GLEN ARBOR, MICHIGAN, ASSIGNOR OF ONE-HALF TO THEODORE C. H. WEGEFORTH, OF CHICAGO, ILLINOIS.

VEHICLE-AXLE.

SPECIFICATION forming part of Letters Patent No. 709,213, dated September 16, 1902.

Application filed December 5, 1901. Renewed August 11, 1902. Serial No. 119,223. (No model.)

*To all whom it may concern:*

Be it known that I, FRANCIS E. FISHER, a citizen of the United States of America, and a resident of Glen Arbor, in the county of Leelanau and State of Michigan, have invented certain new and useful Improvements in Vehicle-Axles, of which the following is a specification.

The present invention relates to vehicle-axles, and has for its object to provide a simple, durable, and efficient construction and arrangement of parts in which a revoluble arbor carries the wheel and is adapted to have rotary movement in a non-rotary tubular housing or main axle attached to the running-gear of a vehicle, all as will hereinafter more fully appear and be more particularly pointed out in the claims.

In the accompanying drawings, illustrative of the present invention, Figure 1 is a fragmentary side elevation of a vehicle-axle embodying the present invention; Fig. 2, a fragmentary longitudinal sectional elevation of the same; Fig. 3, a transverse section at line x x, Fig. 2.

Similar numerals of reference indicate like parts in the several views.

Referring to the drawings, 1 represents a non-rotary tubular housing or main axle secured in any usual manner to the running-gear of the vehicle and which is preferably extended the full width of the vehicle to afford bearings for the opposed wheels of the vehicle.

2 is a wheel-carrying arbor, the outer end of which is made non-circular and fits a correspondingly-formed axial bore in the hub of the wheel. Such outer end is preferably of the tapering form shown and provided with a screw-threaded extension to receive the confining-nut 3, by which the wheel-hub is fastened in place upon such non-circular outer end of the arbor 2.

4 is a cylindrical portion of the wheel-carrying arbor 2, adapted to fit and turn in the cylindrical end bore of the tubular housing or main axle 1 to constitute the journal or bearing of the wheel.

5 is an annular enlargement on the wheel-carrying arbor 2, arranged intermediate the non-circular and cylindrical portions of such arbor and adapted to have abutment against the end of the housing or axle 1 to form an end bearing between the parts. Such enlargement is provided with an overhanging annular flange 6, adapted to form, in connection with the circular enlargement 7 on the end of the housing 1, a dust-cap to prevent the entrance of dust and the like between the bearing-surfaces of the parts, as well as prevent an escape of the lubricant employed. In the preferred construction of such parts, as illustrated in Fig. 2 of the drawings, the enlargements 5 and 7 will be formed with opposed ball-races, between which are arranged the series of balls 8 with a view to reduce the friction and wear at such points.

9 is a plug or filler of any suitable material arranged in the middle portion of the bore of the main tubular housing 1 and adapted to occupy that portion of the said bore not occupied by the cylindrical bearing or body portion 4 of the wheel-carrying arbors.

10 is an annular recess or groove formed in the body portion 4 of the wheel-carrying arbor and near the inner end of such body portion. 11 is a semicircular block fitting said groove and provided with a tapering hole or cavity near its middle for the reception of the tapering point of the securing screw-bolt or stud hereinafter described.

12 is the securing screw-bolt or stud, the screw-threaded shank of which is adapted to screw through a boss or enlargement on the the main housing 1, with its tapering point adapted to engage in the taper hole or cavity of the block 11 heretofore described.

With the described construction the turning of the securing bolt or stud 12 into place will draw the parts into proper relative position, the described taper formation of the point of the securing-bolt being also adapted to take up a limited amount of end play in the parts due to wear of the parts in long-continued use.

13 is a lock-nut on the securing screw-bolt 12 for locking the same at any desired adjustment.

14 is an oil-cup or lubricator, of any usual and suitable construction, attached to the tubular housing 1 in line with the recess 10 in the wheel-carrying arbor and adapted to contain a supply of lubricant for use as required.

Having thus fully described my said invention, what I claim as new, and desire to secure by Letters Patent, is—

1. A vehicle-axle comprising in combination, a fixed tubular housing having an enlarged circular outer end the periphery of which is offsetted to form a ball-race, a wheel-carrying arbor having a non-circular outer portion for engagement with a wheel-hub, a cylindrical body or bearing portion turning in the housing and an intermediate enlargement formed with an annular recess to constitute a companion ball-race, a series of interposed balls, and means for locking the parts against endwise disengagement, substantially as set forth.

2. A vehicle-axle comprising in combination, a fixed tubular housing having an enlarged circular outer end, a wheel-carrying arbor having a non-circular outer portion for engagement with a wheel-hub, a cylindrical body or bearing portion turning in the housing and an intermediate annular enlargement forming an end bearing, and means for locking the parts against endwise disengagement, the same comprising an annular groove in the bearing portion of the arbor, a semicircular block fitting said groove, and screw-bolt passing through the housing and engaging said block, substantially as set forth.

3. A vehicle-axle comprising in combination, a fixed tubular housing having an enlarged circular outer end, a wheel-carrying arbor having a non-circular outer portion for engagement with a wheel-hub, a cylindrical body or bearing portion turning in the housing and an intermediate annular enlargement forming an end bearing, and means for locking the parts against endwise disengagement, the same comprising an annular groove in the bearing portion of the arbor, a semicircular block fitting said groove and formed with a central tapering hole or cavity, and a screw-bolt passing through the housing and provided with a tapering point to engage the cavity of said block, substantially as set forth.

4. A vehicle-axle comprising in combination, a fixed tubular housing having an enlarged circular outer end, a filling-piece occupying the middle portion of the bore of such housing, a wheel-carrying arbor having a non-circular outer portion for engagement with a wheel-hub, a cylindrical body or bearing portion turning in the housing and an intermediate annular enlargement forming an end bearing, and means for locking the parts against endwise disengagement, substantially as set forth.

Signed at Chicago, Illinois, this 3d day of December, 1901.

FRANCIS E. FISHER.

Witnesses:
ROBERT BURNS,
M. H. HOLMES.